(12) United States Patent
Posselius et al.

(10) Patent No.: US 10,391,510 B2
(45) Date of Patent: Aug. 27, 2019

(54) METHOD FOR NOZZLE FLOW DETECTION

(71) Applicant: CNH Industrial America, LLC., New Holland, PA (US)

(72) Inventors: John Posselius, Ephrata, PA (US); Tim Stombaugh, Nicholasville, KY (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/886,484

(22) Filed: Feb. 1, 2018

(65) Prior Publication Data

US 2018/0178237 A1    Jun. 28, 2018

Related U.S. Application Data

(62) Division of application No. 15/267,409, filed on Sep. 16, 2016.

(Continued)

(51) Int. Cl.
*B05B 12/14*        (2006.01)
*B05B 7/32*         (2006.01)

(Continued)

(52) U.S. Cl.
CPC .............. *B05B 12/082* (2013.01); *B05B 7/32* (2013.01); *B05B 12/1418* (2013.01);

(Continued)

(58) Field of Classification Search
CPC ..... B05B 12/082; B05B 7/32; B05B 12/1418; B05B 15/50; B05B 1/3053; G01F 1/666; G01F 25/0007

(Continued)

(56) References Cited

U.S. PATENT DOCUMENTS 3,580,092 A * 5/1971 Scarpa ................... G01F 1/666
                                                    310/322
4,031,826 A * 6/1977 Gemmell .............. E21B 43/263
                                                    102/322

(Continued)

FOREIGN PATENT DOCUMENTS

EP    2080430 A1    7/2009
GB    2012535 A     8/1979
GB    2242271 A     9/1991

OTHER PUBLICATIONS

Capstan Ag Systems Inc.; Capstan PinPoint; PinPoint-3; web-site: http://capstaneg.com/agchem_full.php?Capstan-PinPoint-3.

(Continued)

*Primary Examiner* — Chee-Chong Lee
(74) *Attorney, Agent, or Firm* — Rebecca L. Henkel; Rickard K. DeMille

(57) ABSTRACT

With the use of a low cost microphone mounted at each nozzle, a sound signature of the nozzles may be captured and stored to be used as a continuous indicator of any changes in the flow rate of the nozzles. By measuring changes in sound at each nozzle, it is possible to determine the change in flow before a change in pressure manifests into a problem in the system. The change in sound will oftentimes be significant for plugged nozzles, or nozzles that have excessive wear and flow at too high of a rate. The invention has the advantage of being relatively low cost with ceramic microphones, for example, and with little or no moving parts required. A closed loop control system may be included to compensate for nozzle degradation.

3 Claims, 8 Drawing Sheets

Related U.S. Application Data

(60) Provisional application No. 62/219,908, filed on Sep. 17, 2015.

(51) Int. Cl.
| | | |
|---|---|---|
| *B05B 12/08* | (2006.01) | |
| *G01F 25/00* | (2006.01) | |
| *G01F 1/66* | (2006.01) | |
| *B05B 1/30* | (2006.01) | |
| *B05B 15/50* | (2018.01) | |

(52) U.S. Cl.
CPC .......... *G01F 1/666* (2013.01); *G01F 25/0007* (2013.01); *B05B 1/3053* (2013.01); *B05B 15/50* (2018.02)

(58) Field of Classification Search
USPC .......................................................... 239/71
See application file for complete search history.

(56) References Cited

U.S. PATENT DOCUMENTS

| | | | |
|---|---|---|---|
| 4,193,356 A | | 3/1980 | Vehe et al. |
| 4,197,995 A | | 4/1980 | Campbell et al. |
| 4,286,470 A | * | 9/1981 | Lynnworth ............. G01F 1/662 73/637 |
| 4,318,443 A | * | 3/1982 | Cummins ............. B01F 5/0408 169/15 |
| 4,696,191 A | * | 9/1987 | Claytor ................ G01N 29/032 73/19.01 |
| 4,697,173 A | | 9/1987 | Stokes |
| 4,736,763 A | * | 4/1988 | Britton .................. D06F 39/081 137/10 |
| 4,905,897 A | | 3/1990 | Rogers et al. |
| 5,175,530 A | | 12/1992 | Eng |
| 5,927,603 A | | 7/1999 | McNabb |
| 6,782,311 B2 | | 8/2004 | Barlow et al. |
| 7,250,087 B1 | | 7/2007 | Tyson et al. |
| 7,311,004 B2 | | 12/2007 | Giles |
| 7,742,842 B2 | | 6/2010 | Giles et al. |
| 2010/0082143 A1 | | 4/2010 | Pantaleano et al. |
| 2013/0211628 A1 | | 8/2013 | Thurow et al. |
| 2014/0200837 A1 | * | 7/2014 | Blair ...................... G01N 29/14 702/48 |
| 2016/0325055 A1 | * | 11/2016 | Cameron ............. A61M 11/005 |

OTHER PUBLICATIONS

"Development of a Single Nozzle, High Pressure Liquid Pesticide Metering and Injection System," Brian David Luck, University of Kentucky, 2009.

"Development of a Variable-Orifice Spray Nozzle with High Pressure Chemical Injection for Improved Pesticide Efficacy," Joe David Luck, University of Kentucky, 2012.

* cited by examiner

METHOD FOR NOZZLE FLOW DETECTION

CROSS-REFERENCE TO RELATED APPLICATIONS

This is a divisional of U.S. patent application Ser. No. 15/267,409, filed Sep. 16, 2016, which claims benefit from U.S. provisional patent application Ser. No. 62/219,908, entitled "Nozzle Flow Detection System," filed Sep. 17, 2015, which is incorporated herein by reference.

FIELD OF THE INVENTION

The present invention relates generally to agricultural implements, and in particular, to spray systems providing nozzle flow detection for use with agricultural field sprayers.

BACKGROUND OF THE INVENTION

Field sprayers, as known in the art, are typically attached to, or towed by, an agricultural implement such as a tractor or other vehicle, or are a dedicated self-propelled sprayer vehicle. Such sprayers generally include a fluid holding tank supported by a frame. The fluid holding tank typically stores a crop protection fluid, such as pesticides or liquid fertilizer, which often consists of a carrier fluid (such as water) mixed with a chemical at a predetermined concentration. The fluid holding tank, in turn, is fluidly coupled to a series of spray nozzles spaced apart from one another along booms extending outwardly from the frame. Accordingly, the crop protection fluid may be dispensed through the spray nozzles onto the farm field, preferably in an even distribution spray pattern, so that the fluid is applied consistently across the farm field.

In some situations, the outlet of spray nozzles (orifices) may become obstructed, thereby preventing efficient distribution of the crop protection fluid or liquid fertilizer onto the farm field. For example, when operating in agricultural an environment in which the soil may be disturbed by movement of the sprayer, particles in the environment may cause the orifices of spray nozzles to clog, or impurities in the fluid holding tank may plug the nozzles. There currently is not a low cost way to accurately monitor for small changes in flow or spray patterns. Consequently, what is needed is an improved system in which nozzles may be accurately and cost-effectively monitored for proper discharge of fluid.

SUMMARY OF THE INVENTION

With the use of a low cost microphone mounted at each nozzle, a sound signature of the nozzles may be captured and stored to be used as a continuous indicator of any changes in the flow rate of the nozzles. By measuring changes in sound at each nozzle, it is possible to determine the change in flow before a change in pressure manifests into a problem in the system. The change in sound will oftentimes be significant for plugged nozzles, or nozzles that have excessive wear and flow at too high of a rate. The invention has the advantage of being relatively low cost with ceramic microphones, for example, and with little or no moving parts required. A closed loop control system may be included to compensate for nozzle degradation.

Specifically then, one aspect of the present invention provides a nozzle flow detection system comprising: a spray nozzle assembly providing an outlet for discharging a fluid; a microphone positioned proximal to the outlet of the spray nozzle, the microphone being configured to communicate acoustic data corresponding to a discharge of fluid at the outlet; a data structure holding a calibration measurement corresponding to a discharge of fluid at the outlet, the calibration measurement being derived from acoustic data provided by the microphone; and a controller in communication with the microphone and the data structure. The controller may be configured to receive a flow measurement corresponding to a discharge of fluid at the outlet, the flow measurement being derived from acoustic data provided by the microphone, and to compare the flow measurement to the calibration measurement to determine an error.

The controller may be further configured to generate an alert when the error is greater than a predetermined tolerance. The alert may be visually displayed to an operator of a machine via a Human Machine Interface (HMI).

The fluid may be a mixed fluid, and the spray nozzle assembly may further include first and second inlets for receiving first and second fluids, respectively, and a mixing chamber for mixing the first and second fluids to provide the mixed fluid. The spray nozzle assembly may further include an electronically controlled valve for controlling flow of the mixed fluid between the mixing chamber and the outlet. The controller may be in communication with the electronically controlled valve, and the controller may be further configured to adjust the flow of the mixed fluid between the mixing chamber and the outlet according to the error. The spray nozzle assembly may be one of a plurality of spray nozzle assemblies, such as on an agricultural sprayer.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE DRAWINGS

Figure 1:
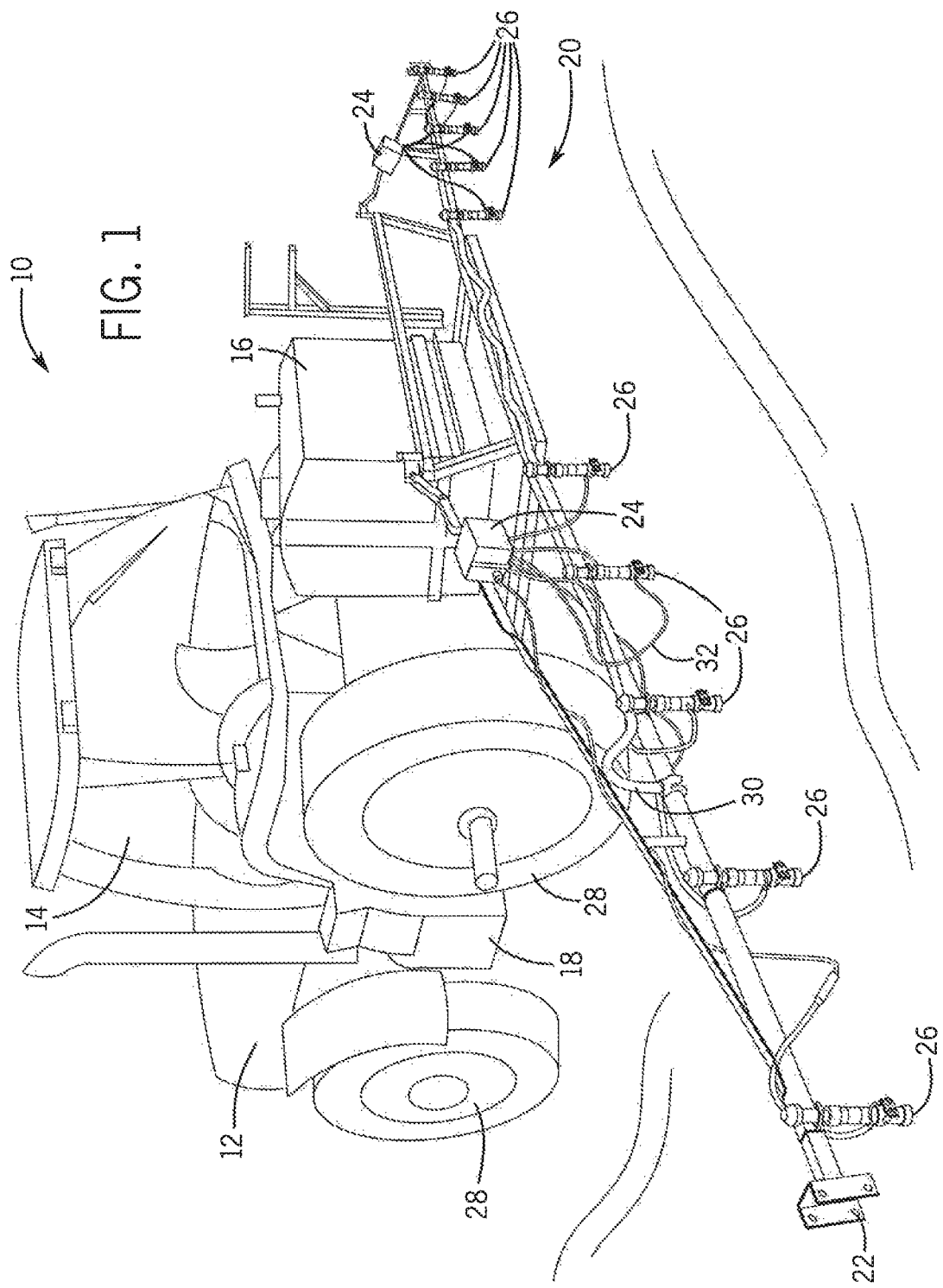
FIG. 1 illustrates a pictorial view of a spraying system in accordance with the present invention.

Referring generally to the drawings, and more particularly to FIG. 1, an exemplar agricultural product application system, which in the illustrated embodiment is a field spraying system 10 (a tractor with a three point mounted sprayer attached), is shown in accordance with the present invention. The field spraying system 10 may comprise a self-propelled sprayer 12 having an operator cab 14 and a primary fluid tank 16 supported by a chassis 18. A rear end 20 of the chassis 18 may support a wing boom 22 (or multiple wing booms) to which one or more secondary fluid tanks, which could be provided as illustrated by reference numeral 24, may be supported. The wing boom 22 also supports a series of spray nozzle assemblies 26 for spraying an area of a field. The chassis 18 is supported by a set of wheels 28, and the wing boom 22, depending on size, may be supported by a set of smaller wheels (not shown).

Primary distribution lines 30 are flow coupled between the primary fluid tank 16 and the spray nozzle assemblies 26. The primary fluid tank 16 may typically store a carrier fluid such as water. The primary distribution lines 30 may provide flow of the carrier fluid to the spray nozzle assemblies 26 directly or indirectly, such as via one or more charge pumps, accumulators, control valves, pressure relief valves, manifolds and/or supplemental distribution lines in the path as understood in the art for effecting various flow rates, pressures and control for sprayer configurations.

Secondary distribution lines, which could be provided as illustrated by reference numeral 32, may be flow coupled between one or more of the secondary fluid tanks 24 and the spray nozzle assemblies 26. The secondary fluid tanks 24 may typically store a chemical fluid, such as a liquid fertilizer, pesticide, herbicide, or the like. The secondary distribution lines 32 may provide flow of the chemical fluid to the spray nozzle assemblies 26 directly or indirectly, such as via one or more charge pumps, accumulators, control valves, pressure relief valves, headers, manifolds and/or supplemental distribution lines in the path as understood in the art for effecting various flow rates, pressures and control for sprayer configurations. Accordingly, the carrier fluid and the chemical fluid may be stored in different tanks and subsequently mixed at each of the spray nozzle assemblies 26 thereby providing improved distribution in the field. The secondary fluid tanks 24 are typically smaller than the primary fluid tank 16.

Figure 2:
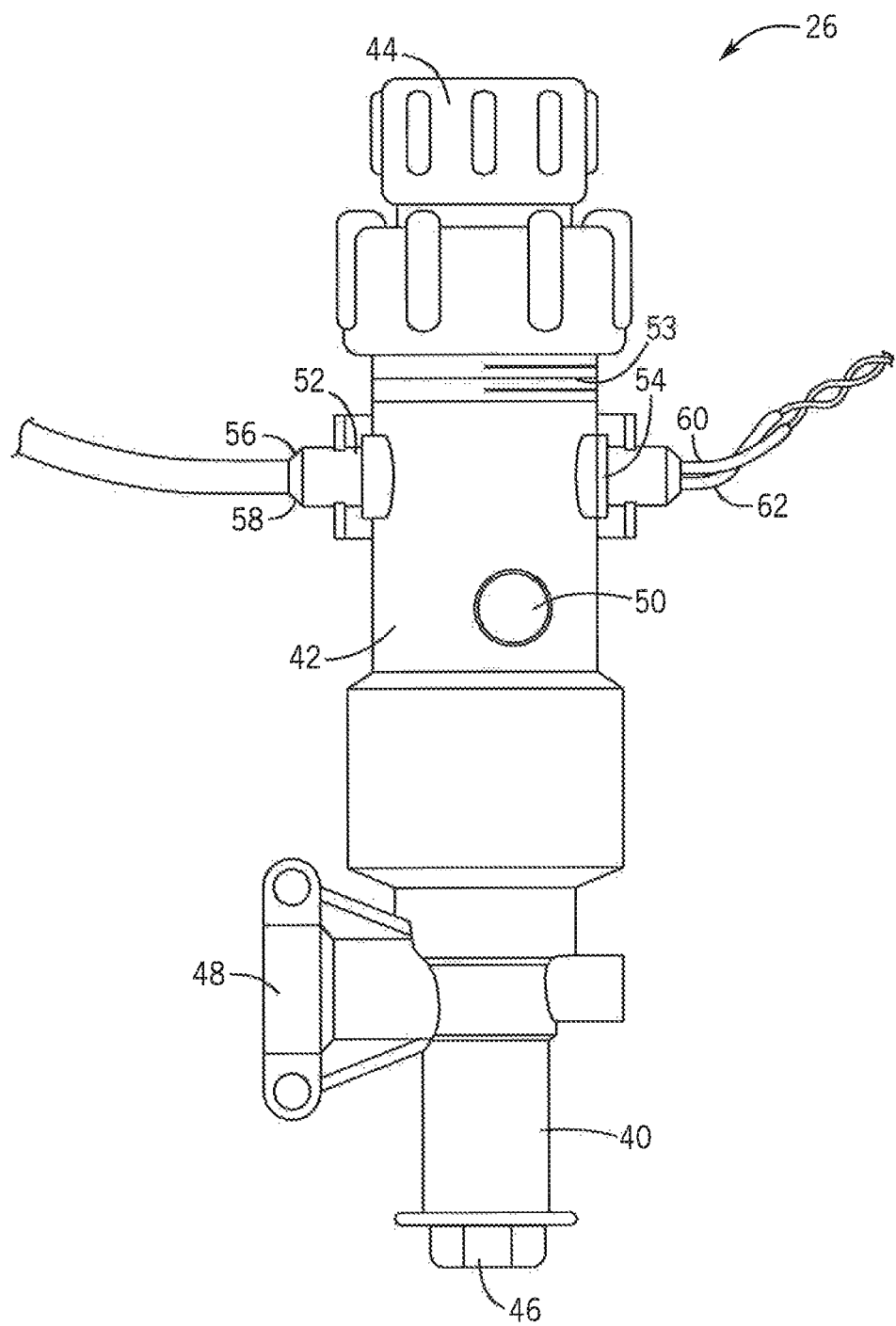
FIG. 2 illustrates a pictorial view of a spray nozzle assembly in accordance with the present invention.

Referring now to FIG. 2, in a spray system, a pictorial view of an exemplar spray nozzle assembly 26 is provided in accordance with the present invention. The spray nozzle assembly 26 may generally include a nozzle body 40, coupled in turn to a mixing body 42, coupled in turn to a control valve 44. In one aspect, the nozzle body 40 may be thread coupled to the mixing body 42, and the mixing body 42 may be thread coupled to the control valve 44, although other temporary or permanent coupling techniques known in the art could be used, such as pressure fittings and/or adhesive agents.

The nozzle body 40 includes a nozzle outlet 46 (exposing an orifice) for spraying a mixed fluid which will typically consist of a carrier fluid (such as water) mixed with a chemical fluid at some concentration. The nozzle body 40 may also include a nozzle body inlet 48 for receiving the carrier fluid. The carrier fluid may come from the primary fluid tank 16 via the primary distribution lines 30.

The mixing body 42 may include a mixing body inlet 50 for receiving the chemical fluid (such as a liquid fertilizer, pesticide, herbicide, or the like). The chemical fluid may come from either of the secondary fluid tanks 24 via the secondary distribution lines 32. Within the mixing body 42, a flow control mechanism (shown in FIG. 3) may provide a mixing chamber for mixing the carrier fluid with the chemical fluid in the nozzle to provide the mixed fluid.

Figure 3:
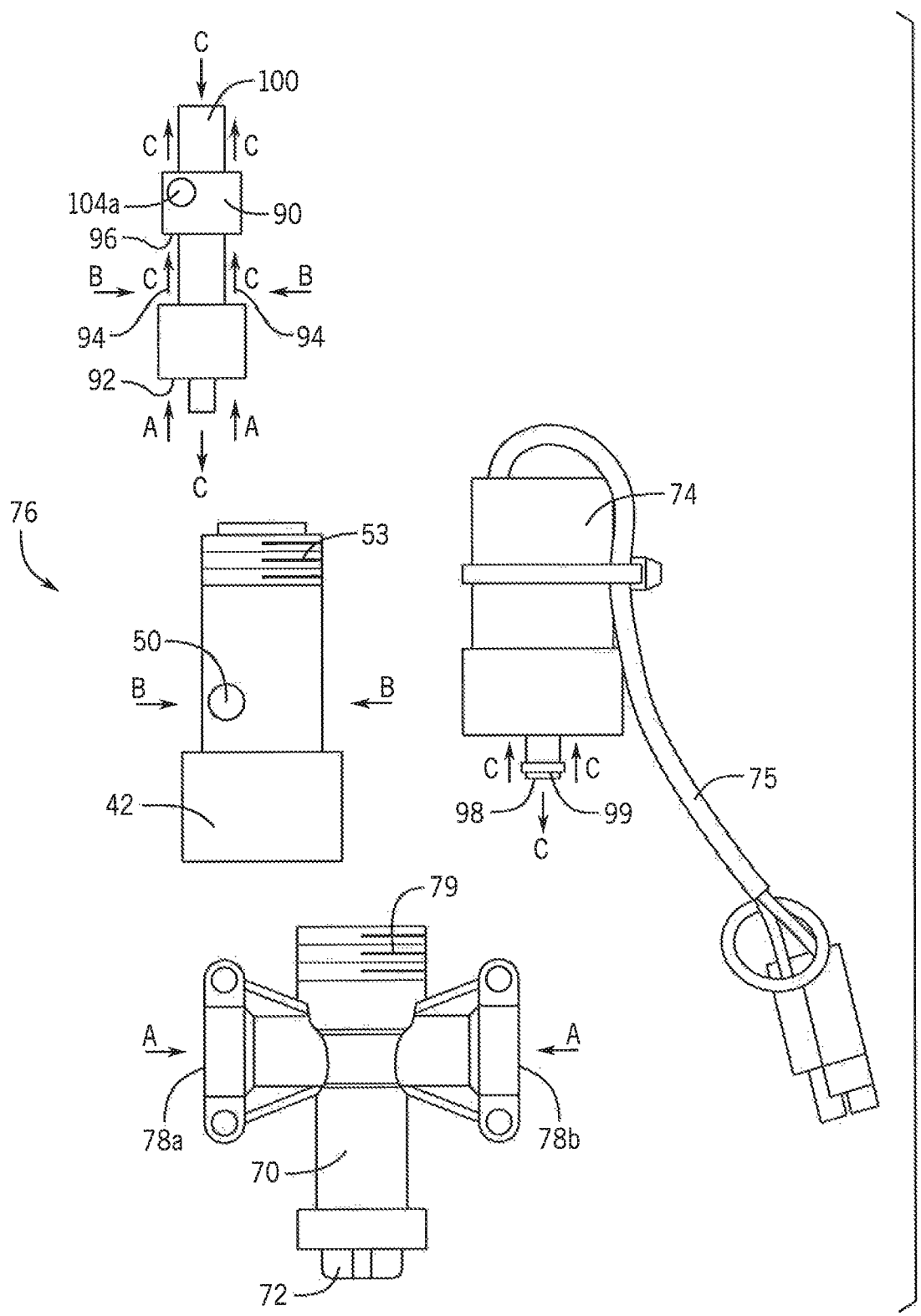
FIG. 3 illustrates an exploded pictorial view of an alternative spray nozzle assembly having the mixing body of FIG. 2, but with an alternative nozzle body and an alternative control valve, in accordance with the present invention.

The control valve 44 operates to stop the mixed fluid from flowing to the nozzle outlet 46, or to allow the mixed fluid to flow to the nozzle outlet 46 for spraying. The control valve 44 could be a passive check valve, as shown in FIG. 2, in which the mixed fluid is mechanically stopped from flowing if there is insufficient pressure applied by the mixed fluid against a valve mechanism, or the mixed fluid is allowed to flow if there is a build-up of sufficient pressure of the mixed fluid against the valve mechanism. Alternatively, the control valve 44 could be an actively controlled solenoid valve, as shown in FIG. 3 by reference numeral 74, in which the mixed fluid is stopped from flowing or allowed to flow depending on a control signal provided to a solenoid which actuates a valve. Accordingly, the control valve 44 may serve to prevent undesirable leaking of the mixed fluid. Also, the control valve 44 may be operator or computer controlled in the field.

Still referring to FIG. 2, a light source 52 and a light sensitive receiver 54 may each be connected to the spray nozzle assembly 26. The light source 52 and the light sensitive receiver 54 may be contained in separate housings, and each of the housings may fit in opposing openings of the mixing body 42 with fluid tight seals. The light source 52 may be any circuit, element or device for emitting light in the mixing body, and may preferably be a Light Emitting Diode (LED). First and second light source signals 56 and 58, respectively, may interface with other control systems or circuitry of the field spraying system 10 and may allow for turning on or off the light source 52, biasing, and/or controlling the intensity, brightness and/or wavelength of light produced by the light source 52.

The light sensitive receiver 54 may be any circuit, element or device for receiving light in the mixing body and generating an electrical signal indicating an amount of light received by the light sensitive receiver 54. The light sensitive receiver 54 may preferably be a photodiode. In particular, the light sensitive receiver 54 may receive light from the light source 52 (passing through the mixed fluid) within the mixing body 42. First and second light sensitive receiver signals 60 and 62, respectively, may interface with other control systems or circuitry of the field spraying system 10 and may allow for sending an electrical signal indicating the amount of light received by the light sensitive receiver 54, biasing, and/or controlling the wavelength of light to which the light sensitive receiver 54 may be sensitive.

In sending the electrical signal indicating the amount of light received, one of the first and second light sensitive receiver signals 60 and 62, respectively, could be used to provide an analog voltage having a magnitude in proportion to the amount of light received by the light sensitive receiver 54, while the other of the first and second light sensitive receiver signals 60 and 62, respectively, could provide a reference level. In an alternative aspect, digital circuitry could be employed in the light sensitive receiver 54 so that the first and/or second light sensitive receiver signals 60 and/or 62, respectively, provide a digital representation of the magnitude of light received.

Referring now to FIG. 3, an exploded pictorial view of an alternative spray nozzle assembly 76 having the mixing body 42 of FIG. 2, but with an alternative nozzle body 70 and an alternative control valve 74, is provided in accordance with the present invention. In this aspect, the nozzle body 70 may include first and second nozzle body inlets 78a and 78b, respectively, for receiving the carrier fluid instead of a single nozzle inlet. Accordingly, the multiple inlets (the first and second nozzle body inlets 78a and 78b, respectively) may allow for alternative implementations of the spray nozzle assembly 76 in the field spraying system 10, such as ganging a plurality of spray nozzle assemblies 76 together. The nozzle body 70 may be coupled to the mixing body 42, for example, via nozzle body threading 79.

Also in this aspect, the control valve 74 is an actively controlled solenoid valve. Accordingly, mixed fluid is stopped from flowing or allowed to flow depending on a control signal provided, via wiring/interconnect 75, to a solenoid which controls the valve. The wiring/interconnect 75 may interface with other control systems or circuitry of the field spraying system 10 for control of spraying applications in the field. The control valve 74 may be coupled to the mixing body 42, for example, via mixing body threading 53. It will be appreciated that with this configuration, if desired, the mixing body 42 could be removed, and the control valve 74 coupled directly to the nozzle body 70, via nozzle body threading 79, to revert to a de-featured implementation.

Also in this aspect, the mixing body 42 of FIG. 2 is used. The mixing body 42 may include a mixing body inlet 50 (or alternatively first and second mixing body inlets) for receiving the chemical fluid.

Within the mixing body 42, a flow control mechanism 90 may be provided for directing fluid flow within the spray nozzle assembly 76. With additional reference to 4A, fluid flow is depicted by way of arrows reference characters. In particular, arrows with the reference character "A" denote flow of the carrier fluid; arrows with the reference character "B" denote flow of the chemical fluid; and arrows with the reference character "C" denote flow of the mixed fluid.

In operation, the carrier fluid A is received via the first and second nozzle body inlets 78a and 78b, respectively, of the nozzle body 70. The carrier fluid A is directed through a first interior opening 92 (which may be a plurality of openings) in the flow control mechanism 90, leading to a mixing chamber 94. The mixing chamber 94 may be defined by a cavity formed by exterior walls of the flow control mechanism 90 and interior walls of the mixing body 42.

The chemical fluid B is received via the mixing body inlet 50 of the mixing body 42. The chemical fluid B is directed to the mixing chamber 94, thereby mixing in the nozzle to form the mixed fluid C. The mixed fluid C, in turn, is directed through a second interior opening 96 (which may be a plurality of openings) in the flow control mechanism 90, leading to the control valve 74.

Upon sufficient pressure of the mixed fluid C, such as with a check valve, or upon actuation of the control valve 74, such as with the solenoid valve, the mixed fluid C will then flow through the control valve 74 and exit via a control valve outlet 98. The control valve outlet 98 is fluidly coupled with an interior channel 100 of the flow control mechanism 90 and may be fluid sealed with a sealing member 99. The mixed fluid C may then, in turn, travel through the interior channel 100 to an orifice 102 proximal to the nozzle outlet 72 of the nozzle body 70 for spraying.

Figure 4B:
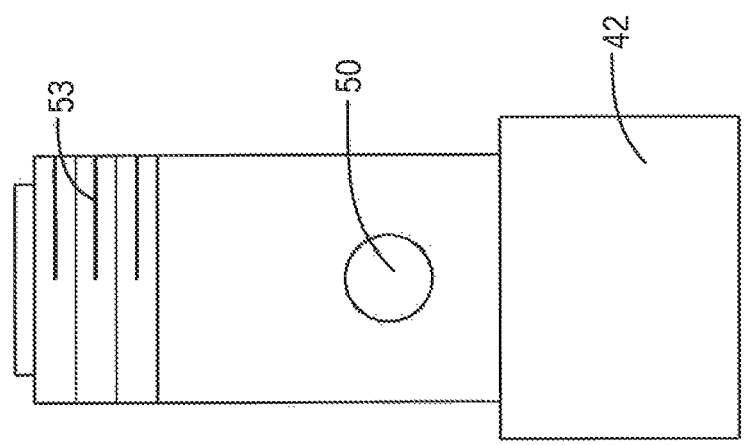
FIG. 4B illustrates a pictorial view of a flow control body, each in accordance with the present invention.
Figure 4A:
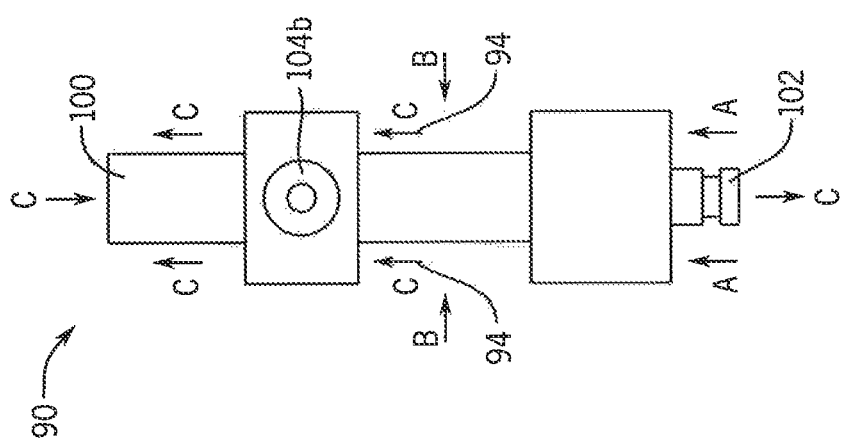
FIG. 4A illustrates a pictorial view of a mixing body.

Still referring to FIGS. 3 and 4B, the mixing body includes first and second openings 104a and 104b, respectively, for accommodating the light source 52 and the light sensitive receiver 54 with fluid tight seals. In one aspect, the first openings 104a could receive the light source 52, and the second opening 104b could receive the light sensitive receiver 54, and the first and second openings 104a and 104b could be opposing such that a fluid inspection region for transmitting light through the mixed fluid is formed in between. Transmission of light from the light source 52 to the light sensitive receiver 54, through the fluid inspection region, may allow determining a concentration of the chemical fluid in the mixed fluid by determining how much light is received by the light sensitive receiver 54 (and how much light is inhibited by the mixed fluid).

Figure 5:
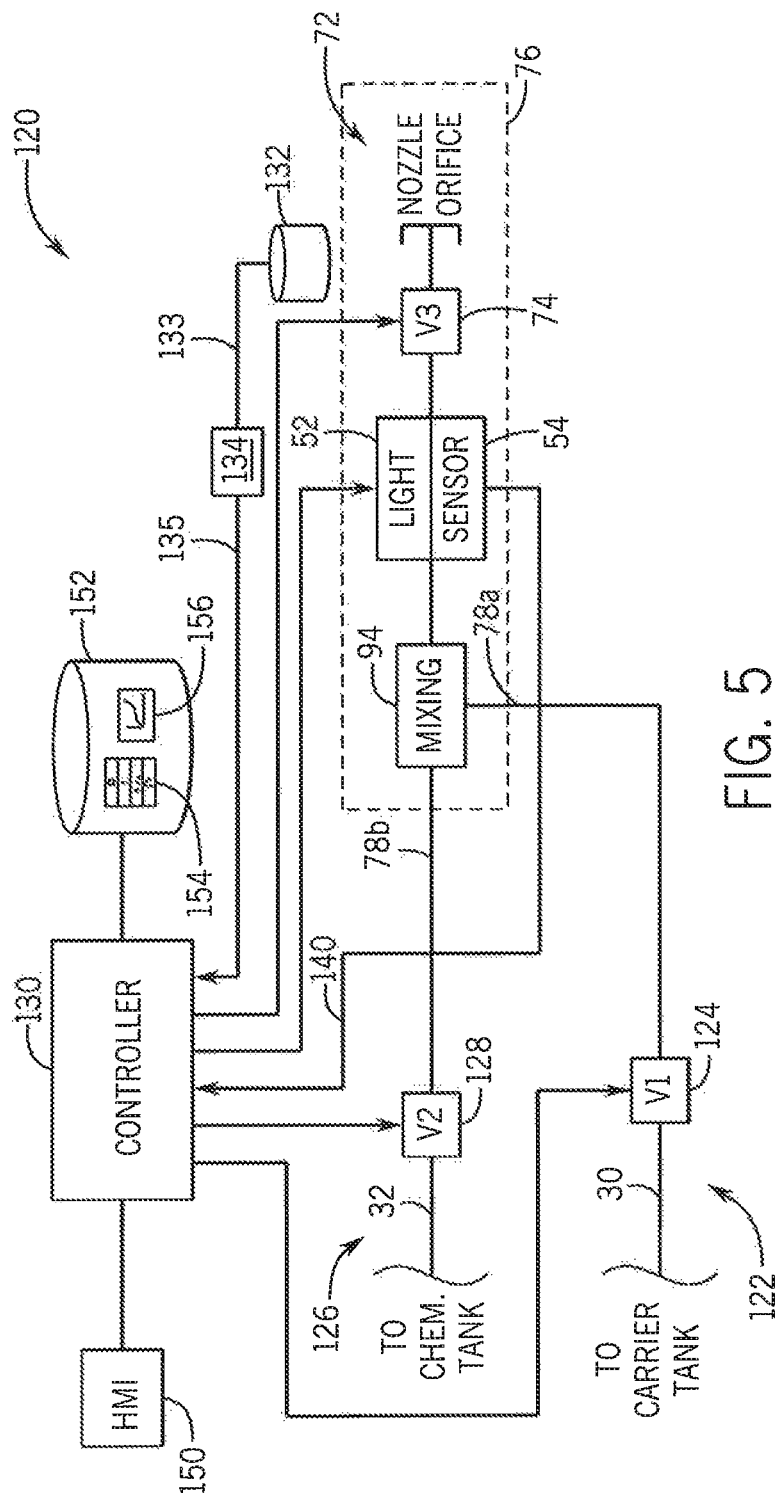
FIG. 5 illustrates a schematic view of a nozzle flow detection system in accordance with the present invention.

Referring now to FIG. 5, a schematic view of a nozzle flow detection system 120 is provided in accordance with the present invention. A first distribution path 122 is provided for distributing a first fluid, which may be a carrier fluid stored in the primary fluid tank 16. The first distribution path 122 may receive the carrier fluid via the primary distribution line 30, and may include a first electronically controlled valve 124 (identified as "V1"), which may be a solenoid valve operating in a manner similar to the solenoid control valves described above with respect to FIG. 3, for metering the carrier fluid to the spray nozzle assembly 76 (and to the mixing chamber 94).

A second distribution path 126 is provided for distributing a second fluid, which may be the chemical fluid stored in the secondary fluid tank 24. The second distribution path 126 may receive the chemical fluid via the secondary distribution line 32. The second distribution path 126 preferably distributes the chemical fluid at a higher pressure than the first distribution path 122 distributing the carrier fluid. The second distribution path 126 may include a metering system which may consist of a second electronically controlled valve 128 (identified as "V2").

A controller 130 may be configured, among other things, to control the first and second electronically controlled valves 124 and 128, respectively. The controller 130 may be a microprocessor, a microcontroller or other programmable logic element as known the art.

The first and second distribution paths 122 and 126, in turn, may be coupled to a spray nozzle assembly 76 (and the mixing chamber 94), such that the chemical fluid and the carrier fluid may be mixed to produce the mixed fluid. The spray nozzle assembly 76, in turn, provides a nozzle outlet 72 (orifice) for discharging the mixed fluid. The spray nozzle assembly 76 may include a third electronically controlled valve 74 (identified as "V3") for controlling flow of the mixed fluid between the mixing chamber 94 and the nozzle outlet 72, and the controller 130 may be further configured to control the third electronically controlled valve 74.

In an alternative arrangement, the chemical fluid and the carrier fluid may be mixed earlier upstream, including being premixed in combined bulk tank, with a single distribution path provided to the spray nozzle assembly as understood the art (instead of separate chemical and carrier tanks with separate distribution paths). Also, although only a single metering system and spray nozzle assembly 76 is shown in FIG. 5 (identified as "n") for ease of understanding, it will be appreciated that the nozzle flow detection system 120 will typically include numerous spray nozzle assemblies 76, and perhaps numerous metering systems, as provided in the field spraying system 10.

Figure 6:
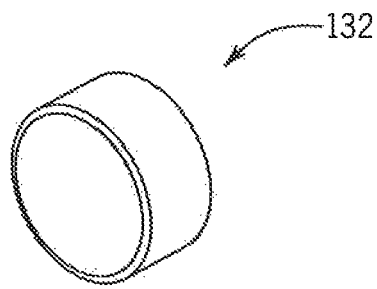
FIG. 6 illustrates a pictorial view of a microphone provided in the nozzle flow detection system of FIG. 5.

Still referring to FIG. 5, a microphone 132 may be positioned proximal to the nozzle outlet 72 of the spray nozzle assembly 76, such as within a few centimeters. The microphone 132, illustrated by way of example in FIG. 6, could be a low cost ceramic microphone, such as a 9.7 mm, noise cancelling, terminal mount, 1.5 V DC, electret condenser microphone as available from CUI Inc. of Tualatin, Oreg. under part no. CMP-5247TF-K. The microphone 132 may be configured to communicate acoustic data 133 corresponding to a discharge of fluid at the nozzle outlet 72. The microphone 132 may be coupled to circuitry 134 for providing signal conditioning and/or processing which, in turn, is provided to the controller 130. Alternatively, the microphone 132 could be coupled directly to the controller 130, and the controller 130 could be configured to provide such signal conditioning and/or processing. As a result, a measurement 135, derived from the acoustic data 133 provided by the microphone 132, is ultimately received by the controller 130.

Within the spray nozzle assembly 76, between the mixing chamber 94 and the third electronically controlled valve 74, the mixed chemical and carrier fluids (i.e., mixed fluid) may pass through a fluid inspection region in which the light source 52 transmits light through the mixed fluid to the light sensitive receiver 54 to produce a feedback signal 140 to the controller 130. The feedback signal 140 may indicate a concentration of the chemical fluid in the mixed fluid.

The controller 130 may also be in communication with a Human Machine Interface (HMI) 150 and a data structure 152. The HMI 150 may consist of a graphical display, such as a touchscreen monitor, warning lights, keyboard and/or other I/O positioned in the operator cab 14. The data structure 152 may include a table, database and/or other objects stored in a non-transient computer readable medium, such as a mass storage device or memory. The data structure 152 may hold a first data set 154 consisting of calibration measurements for the spray nozzles (0 to n), each corresponding to discharge of fluid at respective nozzle outlets 72, and a second data set 156 consisting of correlation data for the spray nozzles, in one aspect correlating frequency response (Hertz) with volumetric throughput (liters per minute).

Figure 7:
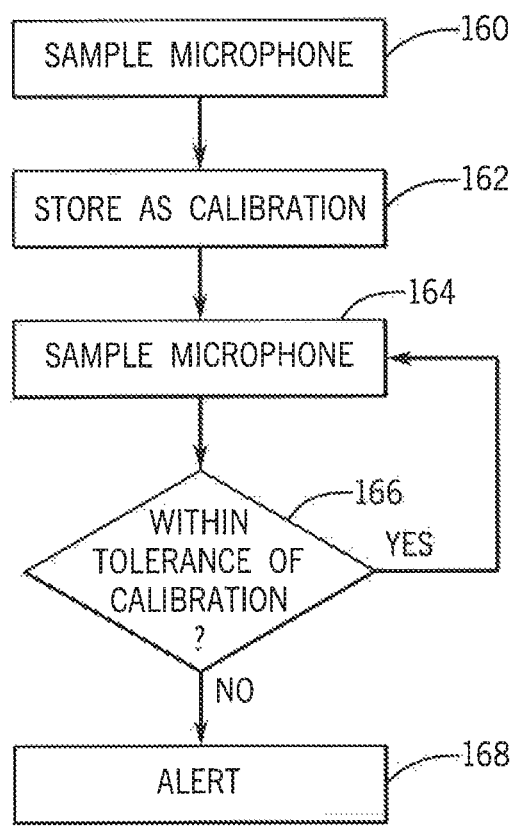
FIG. 7 illustrates a flow chart of the nozzle flow detection system providing an alert in accordance with the present invention.

Referring also to FIG. 7, in one aspect of operation, the controller 130 may receive calibration measurements, via acoustic data from the microphones 132, with each of the spray nozzle assemblies 76 of the field spraying system 10 fully on with the nozzle outlets 72 each spraying the mixed fluid (step 160). The controller 130 may then store such calibration measurements in the first data set 154 of the data structure 152 (step 162).

Next, the controller 130 may subsequently receive flow measurements, via acoustic data from the microphones 132, with each of the spray nozzle assemblies 76 of the field spraying system 10 turned on (step 164). These flow measurements may occur, for example, while spraying in the field.

In decision step 166, the controller 130 compares each of the flow measurements to each of the respective calibration measurements to determine an error for each of the spray nozzle assemblies 76. If the error for each of the spray nozzle assemblies 76 is within a predetermined tolerance, such as a flow measurement being within ±10% of a respective calibration measurement, the process may return to step 164 and repeat. However, if the error for any of the spray nozzle assemblies 76 exceeds a predetermined tolerance, such as a flow measurement exceeding ±10% of a respective calibration measurement, the controller 130 may generate an alert (step 168). Moreover, the alert may be displayed to an operator of the field spraying system 10 via the HMI 150, and the alert may indicate which spray nozzle assembly 76 exceeded the tolerance.

Figure 8:
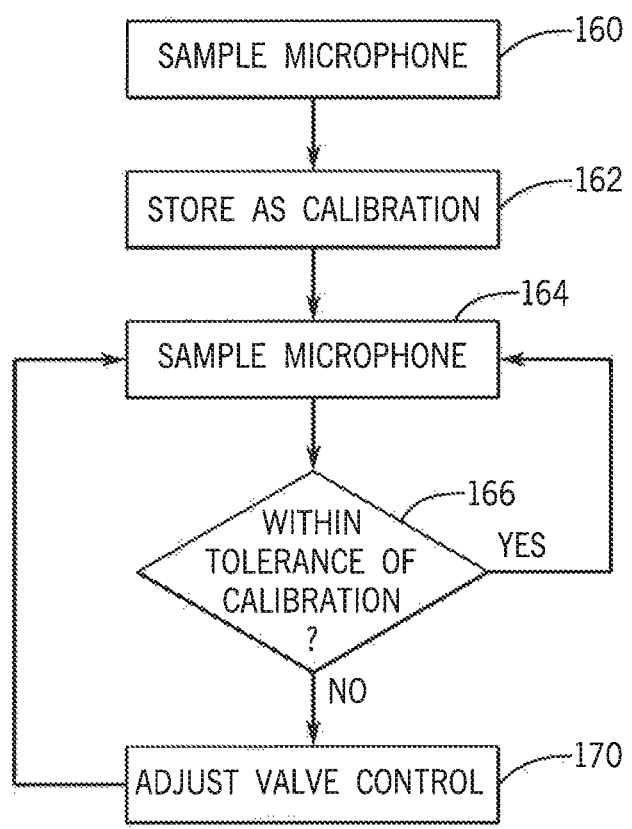
FIG. 8 illustrates a flow chart of the nozzle flow detection system providing closed loop control in accordance with the present invention.

Referring now to FIGS. 5 and 8, in another aspect of operation, the controller 130 may follow substantially the same steps 160 through 166 as described above with respect to FIG. 7. However, if the error for any of the spray nozzle assemblies 76 exceeds a predetermined tolerance, such as a flow measurement exceeding ±10% of a respective calibration measurement, the controller 130 may instead adjust one or more of the first, second or third electronically controlled valves 124, 128 or 74, respectively (step 170). The controller 130 may make the adjustment to reach the calibration measurement, and the amount of adjustment may be made according to the correlation data provided in the second data set 156 of the data structure 152. The controller 130 may implement, for example, closed loop Proportional-Integral-Derivative controller (PID) control to minimize the error. The process may return to step 164 (receive flow measurements) and repeat in the closed loop.

Figure 9:
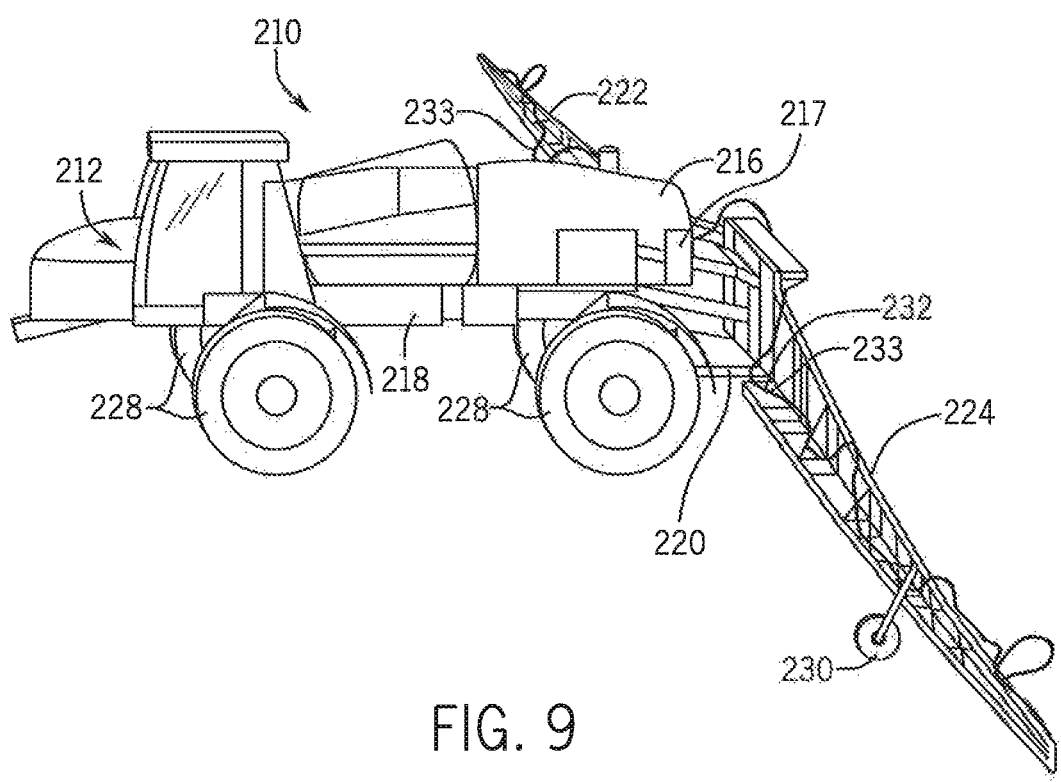
FIG. 9 illustrates a pictorial view of an alternative spraying system in accordance with the present invention.

Referring now to FIG. 9, a pictorial view of an alternative spraying system is provided in accordance with the present invention. A field spraying system 210 may be comprised of a self-propelled sprayer 212 having primary and secondary fluid tanks 216 and 217, respectively, that are supported by a chassis 218 in a known manner. As also known in the art, a rear end 220 of the chassis 218 may supports a pair of wing booms 222, 224 to which a series of the spray nozzle assemblies (not shown) may be coupled. The chassis 218 may be supported by a set of tires 228, and the wing booms may be supported by smaller wheels 230. Primary and secondary distribution lines 232 and 233, respectively, may be flow coupled to the primary and secondary fluid tanks 216 and 217, respectively, in order to provide field spraying capability similar to the field spraying system 10 described above with respect to FIG. 1.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

What is claimed is:
1. A method for nozzle flow detection comprising:
receiving a first fluid at a first inlet of a nozzle body and a second fluid at a second inlet of the nozzle body, the nozzle body including an outlet; and
interconnecting a mixing body to the nozzle body, the mixing body defining a mixing chamber in communication with the first and second inlets of the nozzle body with the mixing body connected to the nozzle body;
receiving the first and second fluids in the mixing chamber and mixing the first and second fluids in the mixing chamber to provide a mixed fluid;
operatively connecting a control valve to the mixing body;
adjusting the control valve to control a volume of the mixed fluid to be discharged from the outlet of the nozzle body
discharging the mixed fluid at the outlet of nozzle body;
using a microphone positioned proximal to the outlet to communicate acoustic data corresponding to the discharge of the mixed fluid at the outlet;
holding a calibration measurement in a data structure, the calibration measurement corresponding to a discharge of fluid at the outlet, the calibration measurement being derived from acoustic data provided by the microphone; and receiving a flow measurement corresponding to a discharge of mixed fluid at the outlet, the flow measurement being derived from acoustic data provided by the microphone;

comparing the flow measurement to the calibration measurement to determine an error; and implement closed loop Proportional-Integral-Derivative controller (PID) control to minimize the error.

2. The method of claim 1, further comprising generating an alert when the error is greater than a predetermined tolerance.

3. A method for nozzle flow detection comprising:

receiving a first fluid at a first inlet of a nozzle body and a second fluid at a second inlet of the nozzle body, the nozzle body including an outlet; and interconnecting a mixing body to the nozzle body, the mixing body defining a mixing chamber in communication with the first and second inlets of the nozzle body with the mixing body connected to the nozzle body;

receiving the first and second fluids in the mixing chamber and mixing the first and second fluids in the mixing chamber to provide a mixed fluid;

operatively connecting a control valve to the mixing body;

adjusting the control valve to control a volume of the mixed fluid to be discharged from the outlet of the nozzle body discharging the mixed fluid at the outlet of nozzle body;

using a microphone positioned proximal to the outlet to communicate acoustic data corresponding to the discharge of the mixed fluid at the outlet;

holding a calibration measurement in a data structure, the calibration measurement corresponding to a discharge of fluid at the outlet, the calibration measurement being derived from acoustic data provided by the microphone; and receiving a flow measurement corresponding to a discharge of mixed fluid at the outlet, the flow measurement being derived from acoustic data provided by the microphone;

comparing the flow measurement to the calibration measurement to determine an error; and adjusting the calibration measurement, and the amount of adjustment is made according to a correlation data provided by a second data set of the data structure.

* * * * *